United States Patent
Aleysa

(10) Patent No.: US 12,553,607 B2
(45) Date of Patent: Feb. 17, 2026

(54) METHOD AND DEVICE FOR CONTROLLING THE COMBUSTION IN FURNACE SYSTEMS

(71) Applicant: FRAUNHOFER-GESELLSCHAFT ZUR FÖRDERUNG DER ANGEWANDTEN FORSCHUNG E.V., Munich (DE)

(72) Inventor: Mohammadshayesh Aleysa, Stuttgart (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 633 days.

(21) Appl. No.: 17/776,494

(22) PCT Filed: Nov. 10, 2020

(86) PCT No.: PCT/EP2020/081593
§ 371 (c)(1),
(2) Date: May 12, 2022

(87) PCT Pub. No.: WO2021/094291
PCT Pub. Date: May 20, 2021

(65) Prior Publication Data
US 2022/0404017 A1 Dec. 22, 2022

(30) Foreign Application Priority Data
Nov. 13, 2019 (DE) .................. 10 2019 217 537.6

(51) Int. Cl.
*F23N 3/08* (2006.01)
*F24B 1/02* (2006.01)

(52) U.S. Cl.
CPC .......... *F23N 3/082* (2013.01); *F23N 2225/10* (2020.01); *F23N 2235/10* (2020.01); *F24B 1/028* (2013.01)

(58) Field of Classification Search
None
See application file for complete search history.

(56) References Cited

U.S. PATENT DOCUMENTS

2007/0100502 A1* 5/2007 Rennie, Jr. ........... G05B 13/048
700/266

FOREIGN PATENT DOCUMENTS

| | | |
|---|---|---|
| DE | 10158225 A1 | 7/2002 |
| DE | 102011108557 A1 | 1/2013 |

(Continued)

OTHER PUBLICATIONS

International Search Report and Written Opinion with English Translation, dated Apr. 1, 2021, pp. 1-24, issued in International Application Number PCT/EP2020/081593, European Patent Office, Rijswijk, The Netherlands.

(Continued)

*Primary Examiner* — Ko-Wei Lin
(74) *Attorney, Agent, or Firm* — Hussey IP, LLC

(57) ABSTRACT

This application relates to a method for controlling the combustion in furnace systems, wherein an oxygen coefficient is determined from the temperature in a combustion chamber area and/or in the waste-gas flues of the furnace system and on the basis of an energy balance of the combustion process in the furnace system, the combustion air and the waste gas, and said oxygen coefficient is used to control the combustion material flows and therefore the (Continued)

thermal output and also the combustion quality. The invention relates to a device for feeding combustion air in the furnace system, which device has a chamber, which on a first side has a main duct for feeding ambient air and/or air from the chimney system and on a second side has a pane-washing air duct and a secondary-air duct, both the pane-washing air duct and the secondary-air duct.

8 Claims, 3 Drawing Sheets

(56) References Cited

FOREIGN PATENT DOCUMENTS

| EP | 0624756 | A1 | 11/1994 |
| EP | 1785786 | A1 | 5/2007 |
| EP | 2085694 | A2 | 8/2009 |
| EP | 2208938 | A2 | 7/2010 |

OTHER PUBLICATIONS

Aleysa, M., Hedegaard Lyng, M., & Dr. Ing. Mohammad Aleysa, "Conceptual, Constructive and Control Engineering: Measures to Reduce Emissions and Increase Efficiency of Firewood Furnaces in Practice," May 18, 2017, pp. 1-48, Lecture in the 7th Specialist Colloquium Measures and Technologies for Reducing Particulate Matter from Biomass Furnaces, Stuttgart, Germany.

Hwam, "Hwam Smart Control: Control the heat in your living room with your mobile phone or Tablet," accessed on Jul. 31, 2017, pp. 1-20, available at URL http://www.hwam.de/hwam-smartConrol/.

Kutzner + Weber, "The Exhaust Flap Program: Intelligent Solutions for Exhaust Gas and Heating Technology—General Overview" accessed Jul. 31, 2017, pp 1-32, available at http://www.kutznerweber.de/fileadmin/kw_images/k+w_pdf/Kutzner_Weber_Abgasklappen.pdf.

Hagebaumarkt, "Sensor for Stove: Aduro Smart Response—For Everyone Suitable for Fireplaces," accessed Apr. 29, 2019, pp. 1-6, available at URL https://www.hagebau.de/p/sensor-fuer-kaminofen-aduro-smart-response-fuer-allekaminoefen-geeignetan550088320/?itemID=B540667#IMPromo=la.

* cited by examiner

METHOD AND DEVICE FOR CONTROLLING THE COMBUSTION IN FURNACE SYSTEMS

CROSS-REFERENCE TO RELATED APPLICATIONS

This application is a 371 nationalization of international patent application PCT/EP2020/081593 filed Nov. 10, 2020, which claims priority under 35 USC § 119 to German patent application DE 10 2019 217 537.6 filed Nov. 13, 2019. The entire contents of each of the above-identified applications are hereby incorporated by reference.

TECHNICAL FIELD

The invention relates to a method and a device, which can be used in particular in this method, for controlling the combustion of fuels, such as solid fuels, in furnace systems, for example in single room furnaces, such as manually loaded single room furnaces.

DETAILED DESCRIPTION

Figure 1:
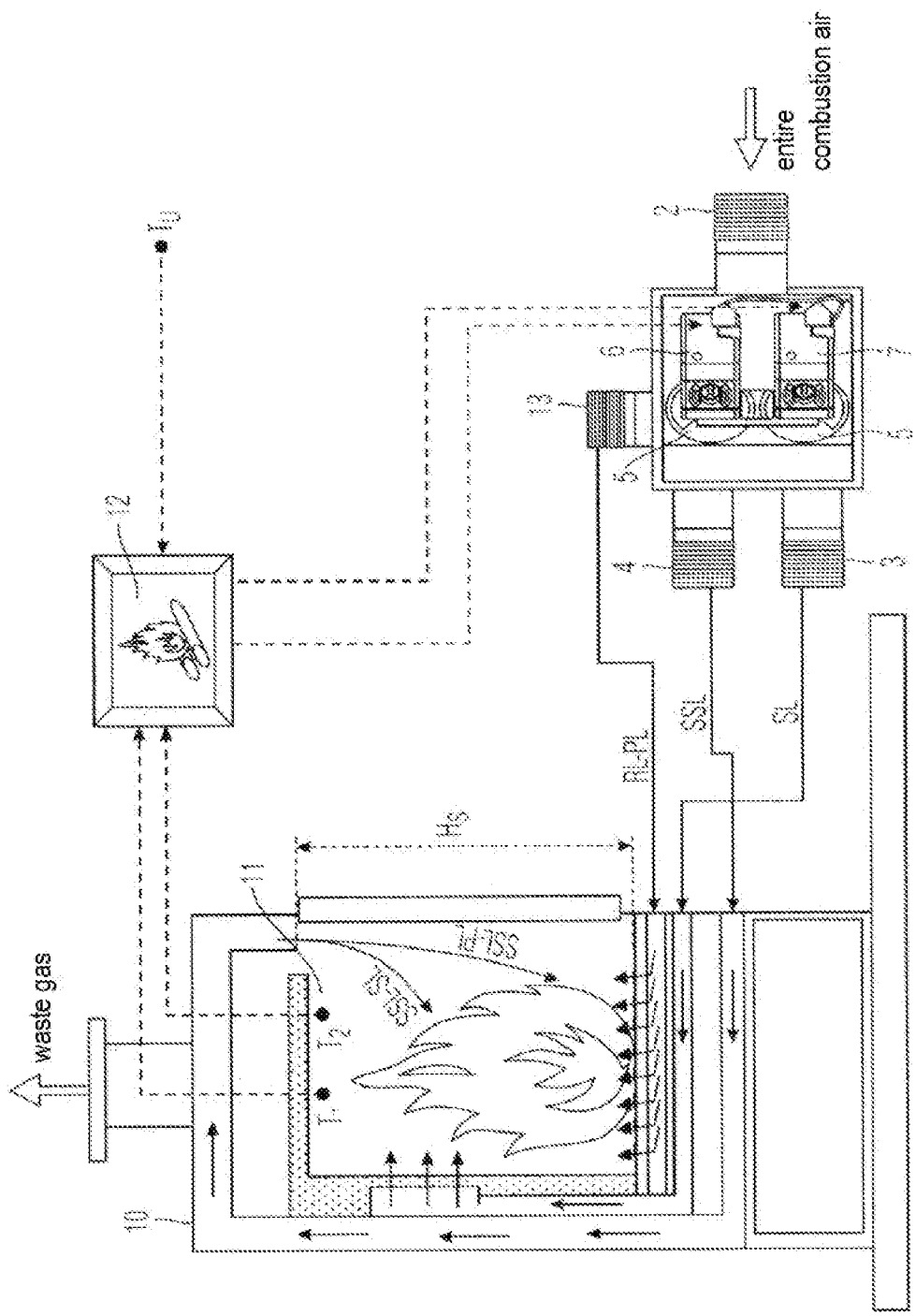
FIG. 1 is a diagram of a manually loaded single room furnace.

Various measures are known for improving the combustion and emission behavior in single room furnaces. Combustion-technical, design and control measures as well as integrated technologies on the basis of catalytic and thermal effects can be used to improve the combustion and emission behavior in single room furnaces.

The combustion principle in single room furnaces plays a major role in the combustion and emission behavior. Optimization of the combustion and emission behavior can be achieved by automatic loading, in which the fuel flow rate as well as the matching combustion air quantity can be adjusted precisely and accurately. Although automatic loading of firewood is technically possible, it cannot be implemented due to the framework, working and operational conditions of single room furnaces. Manual loading through a lock system without opening the combustion chamber door and thus abruptly cooling the combustion chamber is technically possible and can also be practiced in single room furnaces. The lock system not only keeps the combustion chamber warm, but also stabilizes its pressure conditions in such a way that no flue gas or pollutant load can occur in the room regardless of the pressure and flow conditions in the furnace system. In addition, the lock system makes it possible to achieve uniform loading (putting-on system), which results in a significant reduction in emissions.

Depending on the type of combustion air supply into the combustion chamber and its flow direction and shape to the fuel, the combustion process (drying, degassing, gasification, combustion of fuel gas) takes place differently. A combustion process may be called favorable if it produces a fuel gas with favorable combustion-technical characteristics and sufficient heat for the oxidation. Both high-energy (strong) and low-energy (weak) fuel gases result in an unfavorable combustion with numerous pollutants. For example, the supply of combustion air to the lower region of the ember bed results in uncontrolled gasification which requires a regulated precise supply of secondary air. Without an appropriate controlled secondary air supply, incomplete combustion results. A better design of the combustion process also includes the grading of the combustion air so that not only controlled gasification but also rapid cooling of the active reaction zone can be avoided.

The design and flow measures are measures by means of which it is possible to ensure favorable flow conditions with optimum oxidation conditions in the active reaction zone over a relatively long period of time during combustion. The shape, volume and geometry of the combustion chamber as well as the afterburner chamber with the downstream waste gas flues play a major role for the oxidation. In addition, proper positioning and distribution of the primary- and secondary-air openings contribute massively to the stabilization and consequently to the improvement of the combustion quality. An optimum design can be calculated and determined with a flow simulation.

The combustion can also be controlled by control engineering measures.

The combustion process in single room furnaces is controlled exclusively by controlling the combustion air, which must ensure a controlled thermal conversion of the fuel with proper combustion. The control is intended to prevent the combustion process from running into either oxygen deficiency or oxygen excess. In addition, this is intended to ensure that the heat release takes place in a more controlled manner so as to achieve a high degree of heat utilization efficiency with a high level of thermal comfort.

Furthermore, so-called integrated technologies are also known. These technologies are usually installed in the furnace system upstream of the heat exchanger or the heat release. Their main object is to support the oxidation process. In the case of integrated technologies, a distinction has to be made between thermal and catalytic processes:

In the catalytic oxidation processes, the waste gas is fed into the catalytically coated structure (granular fill, foam structure of oxide and non-oxide ceramics, honeycombs, wire cloth or wire mesh). The combustible pollutants in the waste gas, such as carbon monoxide (CO) and hydrocarbons ($C_nH_m$, VOCs, PAKs), come into contact with the catalytically active surface of the catalyst. In the presence of oxygen, the oxidation reactions through the catalyst can already take place at temperatures greater than 300° C. These pollutants are converted by oxidation into substances, such as water and carbon dioxide, and are thus toxicologically mitigated. The catalyst is not consumed in the course of oxidation. It only ensures that the reactions take place at a lower temperature level (already at 300° C. instead of 500° C.).

When used in biomass furnaces, catalytic oxidation processes have the disadvantage that catalytic poisoning occurs during the combustion of unfavorable fuels due to high loads of undesirable pollutants (such as halogens, sulfur, polymers, tar, soot and other aerosols). As a result, the catalytic effect is steadily reduced and, over time, completely eliminated. In addition, the catalytic coating (including the washcoat) is damaged due to high thermal and mechanical (erosion by the dusts or high waste gas velocities) loads as well as strong temperature changes (from about 250° C. to about 900° C.) during the operation or after several hours of operation. It is essential that part of the catalytic coating and heavy metals, such as platinum, rhodium and palladium, are removed over time and can reach the environment via the waste gas and cause health and environmental problems [according to Beebe et al. Heterogene Katalyse I [Heterogeneous Catalysis I], Heidelberg 1943, Janbozorgi et al. Handbook of Combustion, Vol. 1, Weinheim, 2010].

The built-in technology (for thermal oxidation processes) represents a technology developed by Fraunhofer-Institut für Bauphysik IBP [Fraunhofer Institute for Building Physics IBP] within a project funded by FNR. The active principle of the built-in technology is based on the provision of favorable oxidation conditions during combustion within a defined built-in module. This module stores sufficient energy in the form of heat during combustion and automatically makes it available for thermal oxidation when temperatures drop below certain limits (waste gas temperature<module temperature) during combustion. Due to its special architecture, the built-in module ensures intensive mixing of the combustible waste gas components with the combustion air as well as an extension of the active residence time due to multiple deflections or swirling of the waste gases. The stored energy (heat) shall render possible the oxidation of non-combusted components in the waste gas in the unfavorable operating phases, such as when putting on wood, as well as lead to a stable combustion process regardless of the dynamics of the combustion process. The built-in technology has a number of technical and conceptual advantages compared to the currently used technologies for pollutant reduction in small furnace systems, which can ensure its implementation in practice. These advantages include, above all, the guarantee of a safe operation without the need for intensive maintenance (once every two years), long service life (at least 5 years), low specific costs (less than 1.5 € per kilowatt of system output), high technical integration capability, as well as technical flexibility in terms of design and operation and no need for operating energy. The built-in technology has shown a particularly stable performance in the field of both single room furnaces and biomass boilers. Detailed results about this technique can be found in:
Aleysa, M.; Weclas, M.; Leistner, Ph.: *Korrelation der Filter-Reaktor-Architektur mit thermophysikalischen Funktionsbedingungen zur Erforschung und Entwicklung eines nicht-katalytischen* 3D-*porösen Filter-Reaktor-Systems für biomassebetriebene Klein feuerungsanlagen* [correlation of filter-reactor architecture with thermophysical functional conditions for research and development of a non-catalytic 3D-porous filter-reactor system for biomass-fired small-scale furnace systems, final report of a project funded by the German Federal Foundation (DBU), AZ 30550, Stuttgart 2015, 59 pp;
Aleysa, M.; Leistner, Ph.: *Verbesserung des Verbrennungs- und Emissionsverhaltens in biomassebetriebenen Einzelraumfeuerungsanlagen durch den Einsatz spezieller Einbauten* [improvement of combustion and emission behavior in biomass-fired single room furnaces by using special built-ins], final report of a project funded by the Agency of Renewable Resources (FNR), FKZ: 13NR104, Stuttgart, 2016, 162 pp;
Aleysa, M., Leistner, Ph.: *Low-Emission-Verbrennungssystem (LEVS) für die Verbrennung von festen Brennstoffen in Vergaserkesseln* [low emission combustion system (LEVS) for the combustion of solid fuels in gasifier boilers], final report on a research project funded by the German Federal Ministry for Economic Affairs and Energy, FKZ: 03KB093A, Stuttgart, 2017, 168 pp; and
Aleysa, M.: *Konzeptionelle, konstruktive und regelungstechnische Maßnahmen zur Schadstoffminderung und Effizienzerhöhung von Scheitholzfeuerungen im Praxisbetrieb*[conceptual, constructive and control-technical measures for pollutant reduction and efficiency increase of fire wood furnace systems in practical operation], presentation at the 7th Technical Colloquium Measures and Technologies for Fine Dust Reduction from Biomass Furnace Systems, Stuttgart, 18 May 2017.

The combustion-technical control of manually loaded single room furnaces represents a current topic in need of research. The control of the combustion process in furnace systems of this type is very difficult due to the primitive design and the non-automatable fuel feed and requires the development of novel control philosophies.

The initial situation for the use of controllers in single room furnaces is presented here from a normative, technical and sales point of view, which are of great importance for the successful development and implementation of controllers in practice.

Up till now, there are no normative controls for the testing of manually loaded single room furnaces with controllers according to DIN EN 13240, DIN EN 13229, DIN EN 15250 etc. For the development of the control, the parent procedure or the EC Machinery Directive 2006/42/EC shall be used first. The approval of single room furnaces with controllers can be carried out in test laboratories, such as the test laboratory for furnaces and waste gas systems of the Fraunhofer Institute for Building Physics IBP, which have flexible accreditation in the field of furnaces. Within the scope of flexible accreditation (category II), the test laboratories are authorized to develop new test methods and offer them to manufacturers without any further coordination with the Deutsche Akkreditierungsstelle GmbH [German Accreditation Body] (DAkkS). It should be mentioned that the basis for the normative control of the use of controllers in single room furnaces is currently under way and shall be taken into account in the new series of the standard DIN EN 16510.

From a technical point of view, the implementation of the control in single room furnaces is possible. The safety-related application and framework conditions have yet to be defined. In order to achieve a high degree of feasibility in practice, concepts for uniform combustion air supply shall be developed, which can be used independently of the construction and design of the single room furnaces. Individual developments of controllers are not economic or cannot be financed by many medium-sized and small companies.

The integration of controllers in manually loaded single room furnaces leads to a corresponding increase in the acquisition costs and requires a new concept for warranty guarantees. In the case of a high number of single room furnaces, controllers that are susceptible to defects lead to unfavorable economic consequences. The use of sensitive sensors, such as lambda probes, should therefore be avoided.

An important point for the controllers is the necessity for power supply. The dependence of manually loaded single room furnaces on electricity has not been desirable to date, by both manufacturers and users. Therefore, for marketing reasons, such furnaces should be independent of electricity or provide themselves with the necessary electricity. According to the prior art, two technical options are available. In the first option, electricity (up to 250 watts) is generated by thermal (thermoelectric), and in the second option, solar panels are used. Both possibilities require a storage unit. When using lambda probes or similar sensors, which have high power consumption, the use of domestic electricity cannot be avoided.

On the basis of the prior art, the object of the invention is thus to provide a method for controlling the combustion in a single room furnace and a device for this purpose, which does not have the disadvantages of the prior art and by means of which, in particular, a reliable sustainable reduction in pollutant emissions, heat production suitable for mining, and an increase in efficiency can be achieved.

The invention proposes a method for controlling the combustion in furnace systems, for example single furnace systems, such as manually loaded single furnace systems, which is characterized in that an oxygen coefficient is determined from the temperature in a combustion chamber area and/or in the waste gas flues of the furnace system and, if necessary, in the waste gas, as well as via an energy balance of the combustion process in the furnace system, of the combustion air and of the waste gas, with which coefficient the primary and secondary combustion air flows and thus the thermal output as well as the combustion quality are controlled. This control can be carried out quickly.

In this context, an oxygen coefficient shall be defined as a value that provides direct conclusions on the oxygen content in the active oxidation zone or on the oxygen demand for proper combustion.

The following applies to the measurement of the temperature: the earlier and the farther away from the radiation zone the temperature is measured, the more accurate and reproducible is the calculation of the oxygen value. The optimum area for measuring the temperature for control purposes is the first waste gas flue downstream of the waste gas baffle plate in the furnace chamber. This reduces the influence of the ember bed heat radiation on the temperature measurement as well as protects the temperature sensors from thermal load, above all when using unfavorable fuels.

The control concept is technically designed in such a way that it can be used as a cross-manufacturer standard application or as a universal standard solution. It can thus be used not only for new, but also for existing old single room furnaces with reasonable effort.

The control principle and function of the method according to the invention can be illustrated as follows: For a successful development of a universally applicable control system, the combustion process has a standardized combustion air supply (primary (SSL-PL+RL_PL)+secondary air SL).

In particular, the method according to the invention achieves a safe sustainable reduction in pollutant emissions as well as an increase in the efficiency of the thermal conversion of the fuel as well as an improvement of the level of efficiency by a heat production in line with demand due to the permanent detection of the ambient temperature: By controlling the combustion process, a low-pollutant and efficient combustion is ensured due to a more precise supply of the combustion air. Furthermore, by explaining and monitoring the operation to the operators, an optimum operation of the furnace system can be explained digitally in an intuitive and simple way, and the quality of the combustion can be detected and evaluated. The optimum method of operation of the furnace system results from the evaluation of the combustion quality thanks to the intelligence of the control system. The collection of statistical data and evaluation of the functionality of the furnaces in practice is possible.

The method according to the invention is based on an energy balance method. This method compares the energies of the components before and after the combustion. A detailed description is given below. In contrast to the controllers according to the prior art (see above), robust temperature sensors can be used in the combustion chamber area as well as, if necessary, in the waste gas system, by means of which an oxygen signal and thus oxygen coefficient can be generated via an energy balance in the combustion chamber with the aid of parameterizable algorithms, which can be used for a fast/immediate control of the combustion process. For the method according to the invention, it is favorable to detect the temperatures in the combustion chamber area and/or in the first waste gas flue of the first waste gas baffle plate at at least one point for the energy balance as well as in the installation room for a demand-oriented heat production for the purpose of increasing the utilization efficiency and to use them for control purposes.

Furthermore, a virtual signal (so-called emission reference value: ERW signal) can be generated by the signals generated by the temperature sensor via further intelligent algorithms, which is used for the evaluation of the operation. The integral and differential development of the ERW value with time describes a process behavior, with which conclusions can be drawn about the combustion quality with the causes in the negative and positive case.

In one embodiment, the temperature in the combustion chamber can be measured at at least one, for example two, different points. In a further embodiment, the temperature in the combustion chamber can be measured at two points and, if necessary, furthermore the temperature in the waste gas. The temperature sensors mentioned above can be used for these measurements. In this way it is possible to determine the temperatures in a particularly reliable manner.

In one embodiment, the combustion is controlled by the supply of primary air (which can comprise or consist of primary air from the grate air and primary air from the window pane-washing air (PL=RL-PL+SSL-PL) and/or by the supply of secondary air.

The primary air, such as grate air and/or pane-washing air, can be controlled with respect to the desired furnace output or the adjustment of favorable temperatures in the combustion chamber area for an efficient and low-emission combustion. The amount of primary air supplied to the combustion process determines the intensity of the thermal conversion of the fuel and thus the thermal output of the furnace system. When adjusting the primary air, the heat demand of the installation room can additionally be taken into account and the primary air can be adjusted accordingly, allowing heat to be produced in line with demand and consequently allowing heat not only to be produced efficiently but also to be used efficiently. Grate air can be supplied in addition to the pane-washing air when the latter is not sufficient for combustion, as in the case of burning moist or very thick logs or when burning coal.

In one embodiment, the secondary air can be supplied in such a way that the oxygen content in the combustion chamber area is preferably in a favorable range, such as about 7 vol. % to about 10 vol. %, for example about 8 vol. % to about 9 vol. % for optimum post-oxidation. The virtual oxygen signal, which can be generated every second by the algorithms on the basis of the measured temperatures, can be used for the control.

The advantages of the temperature-based control are not only the low production costs and the long service life, but also the parameterizable algorithms, which allow easy handling when adapting the programming and universal use of the controller without any software changes. All relevant process specifications are taken into account in the parameterization factors.

The following is a detailed description of the energy balance method for determining the excess oxygen in the combustion chamber area and the parameterizable algorithm:

Combustion can be represented schematically as follows:

$$C + O_2 \rightarrow CO_2 + \text{heat}$$

Waste gases are produced in this connection. Furthermore, heat losses can occur. Under adiabatic conditions these losses are zero.

The fuel can be described as follows:

$$\dot{m}_A \times H_a + \dot{m}_B \times c_B \times \vartheta_L$$

The combustion air can be represented as follows:

$$\dot{V}_L \times c_{P,L} \times \vartheta_L$$

The waste gas can be represented by the following formula:

$$\dot{V}_R \times c_{P,R} \times \vartheta_R$$

A simplified energy balance in a combustion process is given above. The energy supplied to the combustion process via the fuel is equal to the energy produced during thermal conversion and carried as heat via the waste gas. Adiabatic means that the thermal conversion occurs without any heat losses. This assumption gives rise to formula 1:

$$\dot{m}_A \times H_u + \dot{V}_L \times c_{P,L} \times \vartheta_L = \dot{V}_R \times c_{P,R} \times \vartheta_R \quad \text{formula 1}$$

wherein:
$\dot{m}_A$: fuel mass flow [kg/s], $\dot{H}_u$: calorific value of the fuel, $\dot{V}_L$: specific combustion air quantity [Nm³/kg fuel], $\vartheta_L$: temperature of the combustion air, $\dot{V}_R$: specific waste gas quantity [Nm³/kg], $c_{P,L}$: specific heat capacity of the air under constant pressure, $c_{P,R}$: specific heat capacity of the waste gas under constant pressure, $\vartheta_R$: waste gas or combustion chamber temperature after the completion of combustion, $c_B$: specific heat capacity of the fuel, $\vartheta_m$: fuel temperature at the time of loading.

The combustion chamber or waste gas temperature $\vartheta_v$ described in formula 1 represents the maximum temperature to be reached in the combustion chamber area during the thermal conversion or combustion of the fuel, which is produced under adiabatic conditions or without any heat losses and with the supply of stoichiometric combustion air quantity (lambda: 1).

The energy transferred with the combustion air as well as with the fuel is very small compared to the energy produced during the combustion and can be neglected. This means that formula 1 can be abbreviated into the following form:

$$\dot{m}_A \times H_u = \dot{V}_R \times c_{P,R} \times \vartheta_R \quad \text{formula 2}$$

or for one kilogram of fuel there applies:

$$H_u = V_R \times c_{P,R} \times \vartheta_R$$

The specific amount of waste gas $V_R$ [Nm³/kg of fuel] is calculated from formula 3:

$$V_R = V_{R,min} + (\lambda - 1) \times L_{min} \quad \text{formula 3}$$

When formula 3 is inserted into formula 21, formula 4 is obtained:

$$H_u = c_{P,R} \times \vartheta_R \times [V_{R,min} + (\lambda - 1) \times L_{min}] \quad \text{formula 4}$$

The specific minimum flue gas quantity $V_{R,min}$ and the minimum specific stoichiometric combustion air quantity $L_{min}$ can be calculated approximately according to formula 5 and formula 6, or according to the Rosin-Fehling approximations:

$$L_{min} = 0.241 \times H_u / 1.000 + 0.5 [\text{Nm}^3/\text{kg}] \quad \text{formula 5}$$

$$V_{R,min} = 0.217 \times H_u / 1.000 + 1.67 [\text{Nm}^3/\text{kg}] \quad \text{formula 6}$$

The calculation in formula 5 can also be carried out by the elemental composition of the fuel.

When inserting formula 5 and formula 6 into formula 3, formula 7 is obtained for the calculation of the specific quantity of waste gas [Nm³/kg of fuel]:

$$V_R = 0.217 \times H_u / 1.000 + 1.67 + (\lambda - 1) \times [0.241 + \text{Nm}^3/\text{kg}] \quad \text{formula 7}$$

When formula 4 is rewritten to lambda, formula 8 is obtained to determine lambda or the excess air number:

$$\lambda = H_u / [c_{P,R} \times \vartheta_R \times L_{min}] - V_{R,min} / L_{min} + 1 \quad \text{formula 8}$$

The specific heat capacity $c_{P,R}$ of the waste gas depends on the waste gas temperature and is approximated by formula 9:

$$c_{P,R} = 0.995 + 0.0002 \times \vartheta_R \quad \text{formula 9}$$

When formula 5, formula 6 and formula 9 are inserted into formula 8, formula 10 is obtained to determine lambda or the excess air number:

$$\lambda = H_u / [[0.995 + 0.0002 \times \vartheta_R] \times \vartheta_R \times [0.241 \times H_u / 1.000 + 0.5]] - [0.217 \times H_u / 1.000 + 1.67] / [0.241 \times H_u / 1.000 + 0.5] + 1 \quad \text{formula 10}$$

The supply of the combustion air can be directly controlled by the oxygen coefficient. The determination or calculation of the excess oxygen or oxygen coefficient is not mandatory here.

Lambda is a function of inter alia Hu, $K_B$, $K_F$ and $K_S$:

$$\lambda = f(H_u, K_B, K_F \text{ and } K_S, L_{min} \text{ and } V_{r,min})$$

where:
$L_{min}$: is the minimum quantity of air required for a stoichiometric combustion and:
$V_{r,min}$: is the minimum quantity of flue gas or waste gas produced in a stoichiometric combustion or when lambda=1. $L_{min}$ and $V_{r,min}$ depend on the fuel properties, above all the elemental composition, and are calculated by them directly.

Lambda (after integration of the correction factors $K_B$, $K_F$ and $K_S$ lambda can be referred to as lambda coefficient) is a function of three correction factors $k_B$, $k_F$ and $k_S$:

$K_B$: correction factor of the fuel. This factor takes into account the deviation of the fuel used from the ideal fuel.

$k_F$: correction factor to extrapolate the non-adiabatic energy conversion operations existing during combustion to adiabatic energy conversion operations. Thus, the factor $k_F$ takes into account the thermal losses through the furnace to the temperature measurement point in the combustion chamber area.

$K_S$: takes into account the ratio: primary air (SSL-PL)/secondary air (SSL-SL), which adjusts from the pane-washing air and usually depends on the height of the viewing pane Hs. Here the following applies: the higher the viewing pane of the furnace or Hs is, the more the pane-washing air can act as primary air. Usually $k_S$ assumes a value between 0.93 and 1.07 and is used in the calculation equation of oxygen and not lambda as follows in the equation:

$$\text{or oxygen coefficient} = (21 * \lambda * ks - 21 / \lambda * ks$$

It should be mentioned that the above presented calculation can be converted to the $CO_2$ value. The combustion-related dependence between $CO_2$ and $O_2$ is given by the following formula:

$$CO_2 = CO_{2max} - O_2$$

$CO_{2max}$: 19 vol. % to 21 vol. % (it depends on the carbon content of the fuel)

The correction factors $k_F$, $k_b$ and $k_s$ are explained in more detail below. The specific values are not fixed, they can be calculated by the following mathematical functions:

$$k_b: y=f(x)[x_{min}=500, x_{max}=1000, y_{min}=0.75, y_{max}=1.2]$$

$$k_F: y=f(x)[x_{min}=50, x_{max}=1000, y_{min}=1.0, y_{max}=2.5]$$

$$k_s: y=f(x)[x_{min}=<20, x_{max}=>60, y_{min}<0.93, y_{max}=1.07]$$

The calculations or the factors for the mathematical function are given by the system limits (maximum achievable temperature during a real proper combustion, temperature tendencies and changes during operation).

A further explanation of these correction factors is given below.

Non-adiabatic conditions during the combustion in the furnace can be taken into account by the correction factor $k_F$:

During the combustion in furnaces, heat losses occur due to heat dissipation through the furnace into the installation room and thus non-adiabatic conditions prevail. In order to adjust the non-adiabatic to adiabatic conditions, the correction factor $k_F$ is defined, which takes into account the heat dissipation (unwanted heat losses) through the furnace during the thermal conversion of fuel. It can have a value from one to four depending on the type of single room furnace and the operating condition. This value is determined by a function. Here the following applies: the greater the heat dissipation or heat losses in the combustion chamber area (from the flame zone to the end of the post-oxidation chamber) before the completion of oxidation, the higher the value of this factor.

The functional parameters of the factor $k_F$ can be determined, for example, automatically in software of a control element by a single input of technical data of the type of furnace. Here, the size (area and height) of the combustion chamber, lining of the furnace, size and type of the glazing of the combustion chamber door, etc., play a decisive role.

Furthermore, the type and properties of the fuel and the quality of the condition can be taken into account by the correction factor $k_B$ as follows:

Correction factor $k_B$ takes into account the variation of fuel properties. The value of this factor varies and is calculated during combustion by integrated function in analogy with factor $k_F$, for example, in a correspondingly programmed control device, and is changed in the control algorithms. The function of the correction factor $k_F$ is based on the combustion behavior or the changes in temperatures with time in the combustion chamber area ($d\vartheta_F/dt$). To a large order the following applies: the faster the increase in the combustion chamber temperature, the higher the value of the factor $k_B$. In addition, the following applies: the slower the increase in the combustion chamber temperature, the lower the value of the factor $k_B$. In this case, $k_B$ can have values from 0.80 to 1.2. The factors $k_F$ and $k_B$ also depend on each other. The dependency is also determined and taken into account, for example by integrating it accordingly into the software of a control device.

Furthermore, the quality of operation of the furnace can be taken into account by the correction factor $k_q$ as described below:

The factor $k_q$ only plays a minor role in the control of the combustion air supply or is not relevant for the calculation of the excess oxygen in the combustion chamber area. The values of this factor can be varied and result from an integral calculation or temporal change of the combustion chamber temperature with respect to a certain operating point of the combustion ($d\vartheta_F/dt/d\tau$), $\tau$ describing a point in time or a time range from which or within which the evaluation of the combustion chamber temperature change $d\vartheta_F/dt$ takes place. In contrast to the factor $k_B$, which exclusively takes into account the energy content of the fuel, the factor $k_q$ gives direct conclusions about the loading system (fuel quantity, number of loaded logs, fineness of the fuel, etc.).

According to the above introduced consideration and using the above defined correction factors or an average value of the lower calorific value of 17,000 [kJ/kg], formula 11 results, with which the excess air number can be calculated in a parameterizable way by the factors $k_F$ and $k_B$ or by the temperature measurement in the combustion chamber area.

$$\lambda = 1 + [17{,}000 \times k_B / [[0.995 + 0.0002 \times \vartheta_R \times k_F] \times \vartheta_R \times k_P \times [0.241 \times 17{,}000 \times k_B / 1.000] + 0.5]] - [0.217 \times H_u \times k_g / 1.000 + 1.67] / [0.241 \times H_u \times k_B / 1.000 + 0.5]] \quad \text{formula 11}$$

The excess oxygen in the combustion chamber area follows from formula 12: Oxygen in the combustion chamber area:

$$O_2 = \frac{21 \cdot \lambda - 21}{\lambda} \quad \text{formula 12}$$

Equation 12 can be supplemented by the correction factor $k_s$. It takes into account the ratio of primary air (SSL-PL) to secondary air (SSL-SL), which is established from the pane-washing air and usually depends on the height of the viewing pane $H_s$. Here the following applies: the higher the viewing pane of the furnace ($H_2$) is, the more the pane-washing air can act as primary air. $k_s$ can have a value from 0.93 to 1.07 and it can be inserted into equation 12 as follows: $O_2 = 21 * \lambda * k_s - 21)/\lambda * k_s$:

Formula 11 and/or formula 12 represent the basis for the control of furnace systems with the help of the temperature measurement in the combustion chamber area or on the basis of the energy balance method according to the method of the invention. The above indicated parameters (temperature measurement, energy balance method) are used to both determine the oxygen demand or supply it to the process accordingly and also adjust the optimum oxidation temperatures in the active reaction zone in such a way that proper combustion and consequently operation of the furnace can be ensured.

The oxygen coefficient by the energy balance method can be calculated not only for the secondary air supply, but it is also convenient to identify the limits of the primary air actuator and to reduce the primary air (gasification driving air regardless of how it is supplied to the furnace or through the grate, laterally, or over the fuel) appropriately or in time, and thus to avoid that the combustion gets into the oxygen deficiency.

For the controls, the normative combustion calculations can be taken into account or used.

In one embodiment, the method according to the invention can be carried out automatically. Thus, the control interventions can be carried out automatically. This can be done, for example, by means of a control unit in which the above mentioned formulas are stored in appropriate software, including the correction parameters that may have to be entered. Furthermore, the temperature values from the combustion chamber area and/or the waste gas are then transmitted to this control unit. After calculation of the oxygen in the combustion chamber, the supply of primary air and/or secondary air can be automatically controlled by a control unit. It is also an object of the present invention to provide a device with which this control of the supply of primary and/or secondary air can be carried out in a particularly favorable manner, in particular by means of which the advantages described above can be achieved in a particularly favorable manner.

The device according to the invention for supplying combustion air to the combustion chamber of a single room furnace, is characterized in that it has a chamber which has, on a first side, a main duct for supplying ambient air and/or air from the chimney system and has, on a second side, a pane-washing air duct and a secondary air duct, via which primary and/or secondary air can be fed into the combustion chamber, both the pane-washing air duct and the secondary air duct being provided with a valve so that the pane-washing air duct and the secondary air duct can be closed independently of one another, the valves being connected to a stepless motor so that the valves can be moved steplessly.

The pane-washing air functions as primary air (SSL-PL) and secondary air (SSL-SL), depending on the height of the viewing pane of the furnace system.

For example, the first side of the chamber can here be opposite the second side of the chamber. Other embodiments are also possible.

In one embodiment, the valves can be designed as panes mounted on the air inlet of the primary duct and/or the secondary air duct. In a further embodiment, the valves can control both the pane-washing air via the pane-washing air duct and the grate air via the grate air duct. For an opening of 0% to x % the pane-washing air can be controlled and from 100%-x % the grate air can be controlled, where x denotes the percentage opening width of the valves and is generally 70% to 90% for an adequate design of the air supply ducts.

In a further embodiment, the device can have at least one solar panel and/or a device for the thermoelectric power generation and/or a regular power supply from the domestic socket, and in the three variants mentioned, an intermediate power storage device, e.g. a rechargeable battery, can be provided for a reliable supply of the entire control. In this way, the required power demand of the device can be provided without much effort.

In one embodiment, the device can also have an open-loop or closed-loop control unit which is adapted to automatically control the air supply.

A detailed description of the device is given below:

Air valves with stepless motors can be used to control the combustion air supply. The valves control defined opening widths via two valves, which can be designed, for example, as panes built at the air inlet of the air chambers or ducts separated from one another. The two valves are built into a box or pipe system, which draws all the entire combustion air through a main duct from the surroundings or from the chimney system in the case of the room-air independent operation. The negative pressure and the boiler temperature in the case of single room furnaces with water-bearing components as safety-relevant variables can be detected by means of an installed pressure monitor or temperature sensor and integrated into the software accordingly.

Due to the very low energy consumption of the hardware and the control actuators (control valves), no domestic energy supply is required for the operation of the control system. The power consumption is very low compared to other systems and is in the watt range. This power requirement can be provided by a solar panel, thermoelectrically during combustion, or with a domestic power socket, each possibly with a corresponding simple power storage unit (cf. also above).

In the event of a power failure or a technical defect, the primary air valve turns to the zero position for technical reasons, at which the primary air opening is 100% closed. In order to prevent dangerous conditions such as heavy smoke formation in the living space or deflagration due to the lack of oxygen in the combustion chamber, e.g. during loading in the presence of an ember bed, a mechanism is provided for controlling the combustion air. In this mechanism, when the primary air valve is moved back from a 40% position to a 0% position, a safety air valve that is mechanically interlocked with the primary air valve is simultaneously mechanically actuated, thus providing a correspondingly large opening and thus supplying the combustion process with a sufficient quantity of combustion air for safe combustion. This is only an exemplary description of a technical possibility. It can also be realized with other technical possibilities.

The control of the primary air valve in normal operation can be carried out over 60% (between 40% and 100%) of the total opening width of the primary air, the secondary air being controllable from 0% to 100% of the opening width.

A number of advantages are achieved with the method according to the invention and the device according to the invention:

The control can be carried out with inexpensive, robust and durable sensors, which provide stable signals or do not require maintenance and calibration in the practical operation. Durable temperature sensors can be used here, which require simple electronics for the utilization of the signals.

The automatic control, which can be adapted by adjusting parameters, makes it possible to quickly adapt the control to all types of furnace systems, regardless of their design, without the need to change the software.

The software as well as the hardware with the combustion air distribution system are universally applicable and take into account all normative requirements as well as approval regulations of the DIBt (German Institute for Building Technology) for technical approval or safe operation in practice.

The hardware components with the sensors as well as the control actuators can be selected in such a way that the control system can be operated without any heavy current or domestic power supply. Here, the total power consumption is in the watt range. A simple solar panel can supply the control system with the necessary power.

The technical combination of the air distribution system with the method according to the invention allows a universal use in new furnace systems as well as safe retrofitting of many single-room combustion systems existing in practice.

Due to the intelligent control, the heat is not only produced efficiently, but also used efficiently, as a result of which it is possible to achieve not only resource savings but also significant $CO_2$ savings.

The invention shall be explained in more detail below by means of drawings without limiting the general concept of the invention.

FIG. 1 shows a manually loaded single-chamber combustion system 10. It has a combustion chamber area 11 in which a fuel is burned. Via a pane-washing air duct 3, for example, pane-washing air (SSL) and/or grate air (RL) can be introduced into the combustion chamber area 11, and via a secondary air duct 4, secondary air (SL) can be introduced into this area. The air flows are shown with arrows in FIG. 1. Grate air can be introduced when the oxygen content of the pane-washing air is not sufficient to initiate the combustion with sufficient intensity for reaching favorable temperatures in order to carry out the oxidation reactions, such as in the case of combustion of moist and/or thick logs or coal. The grate air can enter the combustion chamber area 11 from below through the grate. The path of the grate air is shown by means of an arrow in FIG. 1. Both the pane-washing air duct 3 and the secondary air duct 4 can be closed independently of each other by means of valves 5, and these valves can be steplessly adjusted by motors 6, 7 to ensure precise control of the air intake. Two temperature sensors T1, T2 are located in the combustion chamber area 11, which can be provided on the baffle plate, for example. In addition or alternatively, temperature sensors can be mounted in the first waste gas flue downstream of the waste gas baffle plate. However, this is only an example of a location where the temperature sensors $T_1$, $T_2$ can be provided. They can, of course, also be located at other points in the combustion chamber area, such as in the waste gas flue.

Furthermore, another temperature sensor $T_{Ab}$ can be located in the waste gas area, with which the temperature in the waste gas is measured. Furthermore, the ambient temperature $T_u$ in the installation room can be measured and taken into account for the control. Measuring the temperature of the exhaust gas provides more information, however, it is not mandatory but optional. The measured temperature values are transmitted to the control unit 12 (control unit/microcontroller) (see dashed lines). There, the oxygen is calculated on the basis of the above formulas and parameters. Depending on the result obtained, the supply of primary air and/or secondary air can then be controlled by giving appropriate commands to the motors 6, 7. The flows of combustion air are as follows: SSL-SL: pane-washing air as secondary air; SSL-PL: pane-washing air as primary air; RL-PL: grate air as primary air; SL: secondary air.

Figure 2:
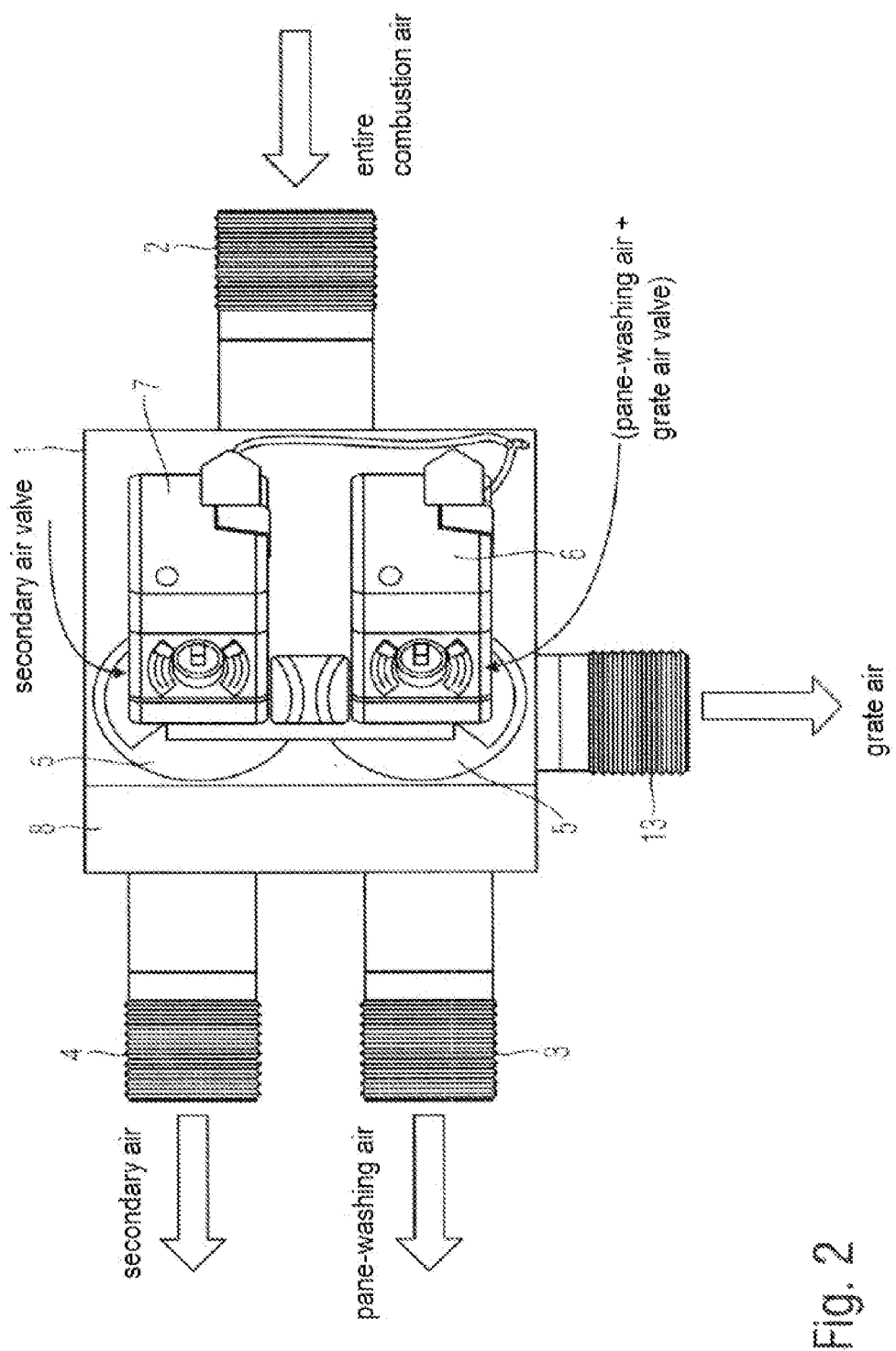
FIG. 2 shows a top view of the device according to the invention.

FIG. 2 shows a top view of the device according to the invention, which can be used to control the supply of primary and/or secondary air to the combustion chamber area. The device has a chamber 1, which has on a first side a main duct 2 for the supply of air and/or air from the chimney system (combustion air) (shown as an arrow) and on a second side a pane-washing air duct 3 (SSL: pane-washing air) and a secondary air duct 4 (SL: secondary air, such as $O_2$), wherein both the pane-washing air duct 3 and the secondary air duct 4 are provided with a valve 5 (only schematically outlined in FIG. 2) so that the pane-washing air duct 3 and the secondary air duct 4 can be closed independently of one another, wherein the valves 5 are each connected to a stepless motor 6, 7, so that the valves 5 can be moved steplessly. Furthermore, a grate air duct 13 is provided, the grate air being controlled by the valve 5, which is connected to the motor 6 for the pane-washing air duct 3.

The device also comprises a solar panel 8, which can be used to generate the necessary electricity to operate the device.

Figure 3:
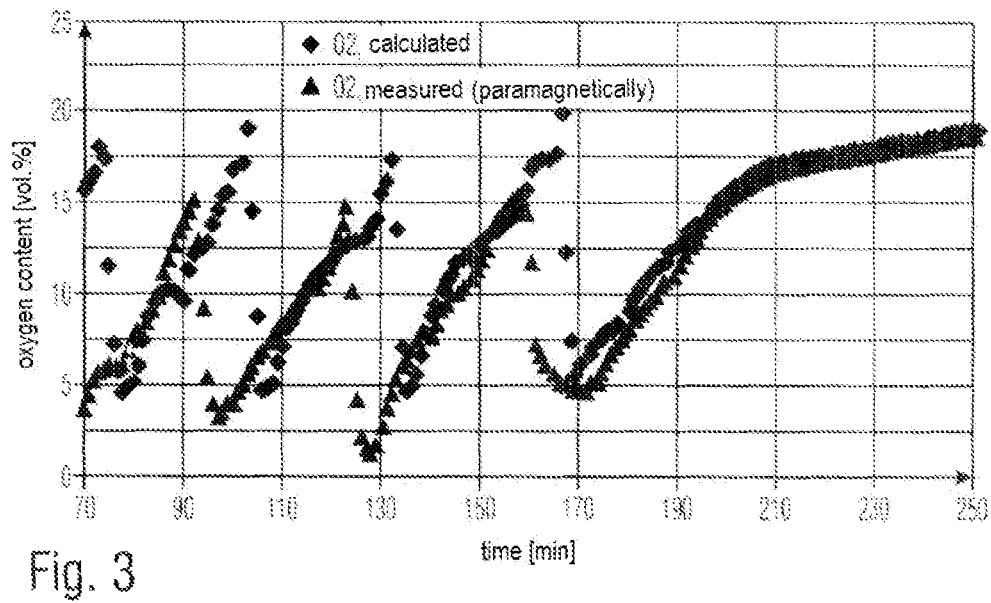
FIG. 3 is a paramagnetically measured oxygen concentration calculated with the model equation in a single room furnace.

FIG. 3 shows the oxygen concentrations calculated according to the model equation and measured with a paramagnetic oxygen analysis during the combustion of beech logs in a prototype of a single room furnace from Hase company. FIG. 3 shows that the concentrations of oxygen in the waste gas, which are calculated and measured on the basis of the model equation correlate and that the model equation is therefore very well suited for determining the oxygen content in the waste gas.

Using a simple test system, the control concept was implemented on the basis of the energy balance method of the Fraunhofer Institute for Building Physics IBP using a PLC control system (programmable logic controller). In this connection the pollutant emissions, such as carbon monoxide, were reduced by 62% and particulate matter by about 43% compared to the operation without control system (see FIG. 4). In addition, the efficiency was increased by about 16% on the basis of the practical operation. A further improvement can be achieved by a further development of the software.

Figure 4:
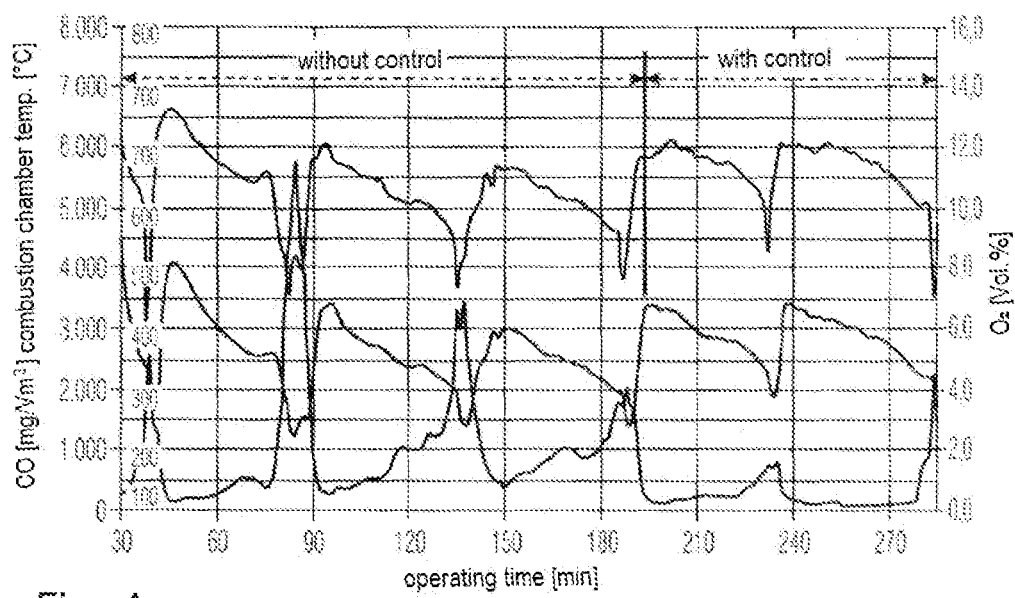
FIG. 4 is oxygen, combustion chamber temperature and carbon monoxide during the operation of a single room furnace.

It is clear from the diagram in FIG. 4 that when the controller is used, the combustion chamber temperature is above a favorable or average combustion chamber temperature of greater than 550° C. over a longer period of combustion. The same applies to the oxygen content in the waste gas, which allows clear conclusions to be drawn about the controlled combustion.

According to the invention, the targeted control of the secondary air (SSL-SL+SL) is carried out by an oxygen coefficient calculated on the basis of the energy balance method.

Moreover, it is also possible to operate the primary air actuator with the oxygen coefficient within its favorable limits, as a result of which the combustion can be prevented from running into oxygen deficiency. This means that if the secondary air actuator reaches its maximum limit (valve 5 of stepper motor 6 (or secondary air actuator) 90% open; here 10% as a reserve) and the calculated oxygen coefficient is nevertheless below the desired oxygen value stored in the program, the primary air (RL-PL+SSL-PL) is reduced in time to avoid oxygen deficiency and thus incomplete combustion. As an alternative to the stepper motor 6, it is also possible to use a servomotor.

The specific control of the primary air (SSL-PL+RL-PL) is carried out for the adjustment of a favorable temperature in the active reaction zone (combustion chamber+post-oxidation chamber) to provide an effective execution of the oxidation reactions or a complete combustion.

The description and evaluation of the combustion quality (completeness of combustion) as well as the operating quality of the furnace is carried out by a differential and integral evaluation of the detected temperatures, calculated oxygen coefficient as well as by the behavior of the control actuators or the stepper motors or the servomotors (6 and 7) for controlling the combustion air supply. In this process, the following knowledge is obtained and the users are informed accordingly or trained digitally for a better operation of the furnace:

Use of moist fuels
Use of dry fuels in large quantities
loading of large quantities of fuel
Illegal burning of wastes such as plastic material, used oil, etc.
Detection of unfavorable or very high or very low chimney flue.

Of course, the invention is not limited to the embodiments illustrated in the drawings. Therefore, the above description should not be considered limiting but explanatory. The below claims should be understood such that a stated feature is present in at least one embodiment of the invention. This does not rule out the presence of further features. If the description or the claims define "first" and "second" embodiments, this designation is used to distinguish between equal features without determining a ranking order.

To clarify the use of and to hereby provide notice to the public, the phrases "at least one of <A>, <B>, ... and <N>" or "at least one of <A>, <B>, ... or <N>" or "at least one of <A>, <B>, ... <N>, or combinations thereof" or "<A>, <B>, ... and/or <N>" are defined by the Applicant in the broadest sense, superseding any other implied definitions hereinbefore or hereinafter unless expressly asserted by the Applicant to the contrary, to mean one or more elements selected from the group comprising A, B, ... and N. In other words, the phrases mean any combination of one or more of the elements A, B, ... or N including any one element alone or the one element in combination with one or more of the other elements which may also include, in combination, additional elements not listed. Unless otherwise indicated or the context suggests otherwise, as used herein, "a" or "an" means "at least one" or "one or more."

The invention claimed is:

1. A method for controlling a combustion process in a single-room furnace system, the method comprising:
   determining an oxygen coefficient from a temperature in a combustion chamber area and/or in a waste gas flue of the single-room furnace system, and an energy balance of the combustion process in the single-room furnace system, and an amount of a combustion air, and an amount of a waste gas; and
   controlling a primary combustion air flow and a secondary combustion air flow, and thus a thermal output and a combustion quality, by means of the oxygen coefficient.

2. The method of claim 1, wherein an oxygen demand for the combustion process is calculated according to the following formula:

$$O_2 = (21 \ast \lambda - 21)/\lambda,$$

where $\lambda$ is determined as follows $$\lambda = 1 + [17.000 \times k_B / [[0.995 + 0.0002 \times \times \vartheta_R \times k_F] \times \vartheta_R \times k_F \times [0.241 \times 17.000 \times k_B / 1.000] + 0.5]] - [0.217 \times H_u \times k_B / 1.000 + 1.67] / [0.241 \times H_u \times k_B / 1.000 + 0.5]]$$

where $k_B$ has a value of 0.80 to 1.2, $\vartheta_R$ is a waste gas and/or combustion chamber temperature, $k_F$ has a value of 1 to 4, and $H_u$ is the calorific value of fuel combusted in the combustion process.

3. The method of claim 1, wherein the temperature in the combustion chamber area and/or in the waste gas flue is measured at at least one point.

4. The method of claim 1, wherein the temperature in an installation room of the single-room furnace system is measured for a heat production in accordance with demand.

5. The method of claim 1, wherein the primary air is pane-flushing air and/or grate air.

6. The method of claim 1, wherein the supply of secondary air is affected in such a way that the oxygen content in the combustion chamber area is about 7 vol. % to about 10 vol. %.

7. The method of claim 1, wherein the control of the combustion process takes place automatically.

8. The method of claim 1, wherein the supply of secondary air is affected in such a way that the oxygen content in the combustion chamber area is about 8 vol. % to about 9 vol. %.

* * * * *